United States Patent
Yamamoto et al.

(10) Patent No.: US 7,365,880 B2
(45) Date of Patent: Apr. 29, 2008

(54) IMAGE PROCESSING APPARATUS AND IMAGE PROCESSING METHOD

(75) Inventors: Naofumi Yamamoto, Kawasaki (JP); Takahiro Fuchigami, Yokosuka (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 908 days.

(21) Appl. No.: 10/700,527

(22) Filed: Nov. 5, 2003

(65) Prior Publication Data

US 2004/0212838 A1    Oct. 28, 2004

Related U.S. Application Data

(60) Provisional application No. 60/459,999, filed on Apr. 4, 2003.

(51) Int. Cl.
*H04N 1/40* (2006.01)
*G06K 9/34* (2006.01)

(52) U.S. Cl. .............. 358/2.1; 358/1.9; 358/3.01; 358/3.24; 358/3.27; 358/3.06; 358/504; 358/518; 358/524; 382/176; 382/164; 382/167; 382/162; 382/276; 382/282; 382/248; 382/300

(58) Field of Classification Search ........... 358/2.1, 358/3.01, 3.24, 3.26, 3.27, 5, 1.9, 3.06, 504, 358/518, 524; 382/164, 173, 176, 162, 167, 382/276, 247, 300

See application file for complete search history.

(56) References Cited

U.S. PATENT DOCUMENTS

| 4,926,251 | A  |   | 5/1990  | Sekizawa et al. |
|-----------|----|---|---------|-----------------|
| 5,072,291 | A  |   | 12/1991 | Sekizawa |
| 5,134,667 | A  | * | 7/1992  | Suzuki ............. 382/164 |
| 6,424,742 | B2 |   | 7/2002  | Yamamoto et al. |
| 6,690,487 | B1 | * | 2/2004  | Yamazaki ........... 358/1.9 |

FOREIGN PATENT DOCUMENTS

| EP | 0 899 685 B1 | 10/2002 |
|----|--------------|---------|
| JP | 58-3374 A    | 1/1983  |
| JP | 60-204177 A  | 10/1985 |
| JP | 7-288679 A   | 10/1995 |
| JP | 11-69150 A   | 3/1999  |
| JP | 11-112796 A  | 4/1999  |

* cited by examiner

*Primary Examiner*—King Y. Poon
*Assistant Examiner*—S. Kau
(74) *Attorney, Agent, or Firm*—Foley & Lardner LLP (57) ABSTRACT

An image region discrimination section in an image processing section, a characteristic signal calculation result obtained by hardware is subjected to macro-scoped correction and macro-discrimination by a processor. Further, in the image region discrimination section, a resolution and a signal bit number of a characteristic signals are decreased, the resultant characteristic signals is stored in a memory, and both a macro-discrimination result and the characteristic signals are synthesized to produce a final discrimination signal.

12 Claims, 8 Drawing Sheets

IMAGE PROCESSING APPARATUS AND IMAGE PROCESSING METHOD

CROSS-REFERENCE TO RELATED APPLICATIONS

This application claims the benefit of U.S. Provisional Application No. 60/459,999, filed Apr. 4, 2003.

BACKGROUND OF THE INVENTION

1. Field of the Invention

The present invention relates to an image processing apparatus and an image processing method for subjecting an input color image to image processing, for example, in a digital color copying machine that reads a color image on an original and forms a copy image of the color image.

2. Description of the Related Art

In an apparatus, such as a digital copying machine, which handles a document image as a digital signal, in order to perform image recording with both high resolution and a good tone rendition, an image region discrimination process is used.

In the image region discrimination process, an image to be recorded is discriminated into a part, e.g. a photo part, for which a tone rendition is important, and a part, e.g. a text part, for which resolution is important. Based on the discrimination result, a recording process is switched.

Image region discrimination methods, in general terms, fall into three categories: microscoped-discrimination which uses a difference in local characteristic such as microscopic image density or density variation; macro-scoped correction which makes fine corrections of a discrimination result by referring to a micro-discrimination result in a large region of a certain size; and macro-discrimination which discriminates a region on the basis of a result of general analysis of document structure.

For example, in conventional micro-discrimination techniques disclosed in Jpn. Pat. Appln. KOKAI Publication No. 58-3374 and Jpn. Pat. Appln. KOKAI Publication No. 60-204177, the presence/absence of an edge part is basically discriminated. It is thus difficult to increase the precision in discrimination between an edge part of a tone image and a character part, or in discrimination of an inside of a thick character.

In the macro-scoped discrimination, micro-discrimination is first performed and then correction is made by referring to a discrimination result of a region near a pixel of interest, making use of the feature that an image region, such as a halftone-screen region or a photo region, is constant in a relatively broad range. With this method, the precision in discrimination can be improved. However, if a large region is set as a reference region, the circuitry scale increases, leading to a rise in cost. In addition, since an edge part is basically detected, it is difficult to enhance the precision in discrimination between an edge part of a tone image and an inside part of a thick character.

For example, in the conventional macro-discrimination technique disclosed in, e.g. "Extraction algorithm of character region for mixed-mode communication", IEICE (the Institute of Electronics, Information and Communication Engineers), Trans., J67-D, vol. 11, pp. 1277-1284 (1984), a document structure is analyzed from information on an entire document image. Thus, an enormous length of processing time is required, or a high-speed processor is required.

BRIEF SUMMARY OF THE INVENTION

An advantage of an aspect of the present invention is to provide an image processing apparatus capable of performing an image region discrimination process that can satisfy all requirements for a discrimination precision, circuitry scale and processing speed.

According to an aspect of the present invention, there is provided an image processing apparatus comprising: a characteristic signal calculation section that calculates a characteristic signal of an input image signal; a conversion process section that executes a conversion process for decreasing a signal amount of a characteristic signal calculated by the characteristic signal calculation section; a storing section that stores the characteristic signal that is converted by the conversion process section; an arithmetic section that reads out the characteristic signal stored in the storing section and executes a predetermined arithmetic operation; a synthesizing process section that outputs a discrimination signal by synthesizing an arithmetic result of the arithmetic section and the characteristic signal calculated by the characteristic signal calculation section; and an image processing section that executes a color conversion process, a filter process and a tone process for the image signal in accordance with the discrimination signal output from the synthesizing process section.

According to another aspect of the present invention, there is provided an image processing method for an image processing apparatus, comprising: calculating a characteristic signal of an input image signal; executing a conversion process for decreasing a signal amount of a calculated characteristic signal; storing the converted characteristic signal; reading out the stored characteristic signal and executing a predetermined arithmetic operation; outputting a discrimination signal by synthesizing an arithmetic result of the arithmetic operation and the calculated characteristic signal; and executing a color conversion process, a filter process and a tone process for the image signal in accordance with the output discrimination signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

In embodiments of the present invention, in order to solve the above problems, micro-discrimination is first conducted by making use of local characteristic differences. Then, the result of the micro-discrimination is subjected to a macro-scoped correction process by the processor and software. Further, based on the obtained signal, the general structure of the original image is analyzed and macro-discrimination is performed. By synthesizing these results, a final discrimination result is calculated.

By combining the micro-discrimination and macro-discrimination in the above manner, a high-precision, high-resolution discrimination process can be performed.

In addition, characteristic signal computation for a small reference region is performed by hardware, and macro-scoped correction processing and macro-discrimination for a large reference region are performed by software. Thereby, a discrimination process, wherein a hardware scale and a processing computation speed are well balanced, can be realized.

The structure of a first embodiment of the invention will now be described.

Figure 1:
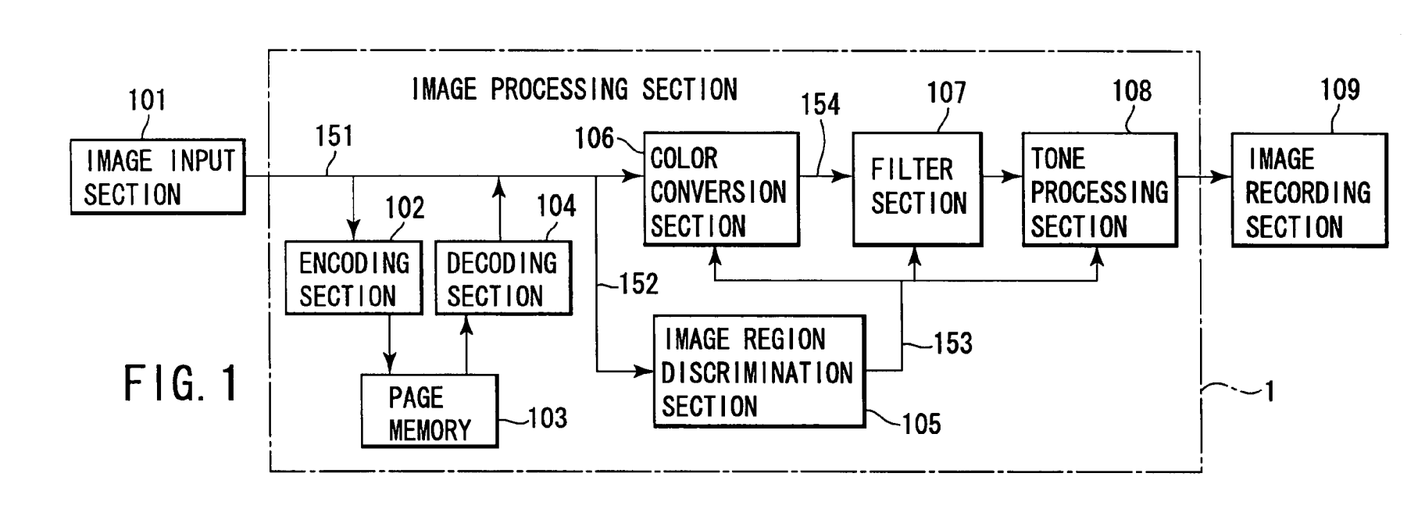
FIG. 1 is a block diagram showing the structure of an image processing section according to a first embodiment of the invention.

FIG. 1 is a block diagram showing the structure of a digital color copying machine having an image region discrimination section 105. The digital color copying machine comprises an image input section 101, an image processing section 1 functioning as an image processing apparatus, and an image recording section 109. The image processing section 1 includes an encoding section 102, a page memory 103, a decoding section 104, the aforementioned image region discrimination section 105, a color conversion section 106, a filter section 107 and a tone processing section 108.

Embodiments of the present invention is applied to the image region discrimination section 105. A description of editing processes such as an enlargement/reduction process, a trimming process and a masking process is omitted here, since these processes are not directly related to embodiments of the present invention. Processing sections for these processes are disposed, for example, immediately after the image input section 101.

The whole structure and the content of the processing are described in brief.

To begin with, the structure of the image input section 101 is described.

The image input section 101 reads or scans an original image (i.e. an image on an original) and outputs a color image signal 151.

The color image signal 151 represents RGB reflectances of each pixel on the original, and are produced as three time-series signals acquired by two-dimensionally scanning the information of each pixel. In this case, the number of pixels scanned per unit length is called "pixel density". In the present embodiment, the scan density is 600 dpi, that is, a density of 600 pixels per 25.4 mm.

Next, the structures of the encoding section 102, decoding section 104 and page memory 103 are described.

The color image signal 151 output from the image input section 101 is compression-encoded by the encoding section 102, and the encoded signal is stored in the page memory 103. The color image signal stored in the page memory 103 is decoded by the decoding section 104 and is output as a color image signal 152.

The structure of the image region discrimination section 105 is described.

The image region discrimination section 105 receives the color image signal 152 and discriminates the attributes of pixels based on the color image signal 152. The image region discrimination section 105 outputs the discrimination result as a discrimination signal 153. In this embodiment, the following four kinds of attributes of pixels are discriminated:

1. black character,
2. chromatic character,
3. halftone-screen tone image, and
4. continuous tone image.

The discrimination signal 153 takes a value of any one of the above four kinds. The image region discrimination section 105 is the main point of embodiments of the present invention. The structure and function of the image region discrimination section 105 will be described later in detail.

The structure of the color conversion section 106 is described.

The color conversion section 106 converts the RGB color image signals 151 representing RGB reflectances on one original to CMYK density signals 154 representing densities of color materials to be recorded.

Figure 2:
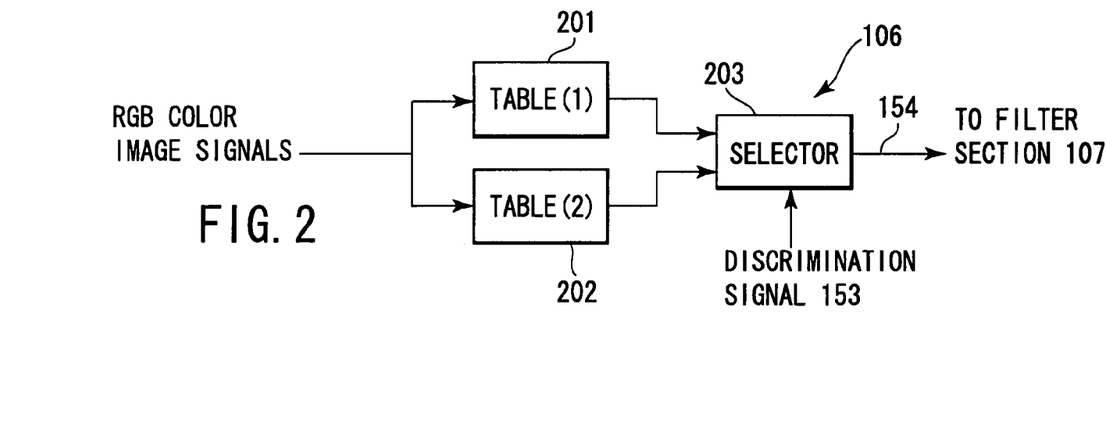
FIG. 2 shows the structure of a color conversion section according to the first embodiment.

FIG. 2 shows the structure of the color conversion section 106. The color conversion section 106 comprises a table 201, a table 202 and a selector 203.

The conversion from RGB color image signals 151 to CMYK density signals 154 is effected by the combination of the reference to rough lookup tables (LUTs) and an interpolation process. The LUT has input addresses of 9×9×9 or 17×17×17, and outputs CMYK values of (8 bits×4 colors). In short, the input of each table 201, 202 corresponds to the RGB color image signals 151, and the output thereof corresponds to CMYK density signals 154.

The upper 3 bits (or upper 4 bits) of each RGB color image signal 151 are used for selection, and the lower 5 bits (or 4 bits) are used for the interpolation process of, e.g. primary interpolation.

Two kinds of LUTs (tables 201 and 202) are prepared for a photo region and a text region. For example, the table 201 is used for a photo region, and the table 202 is used for a text region.

The LUT for a photo region increases a black ratio in a region near black, placing a stress on tone reproducibility. On the other than, the LUT for a text region extremely increases a black ratio in a chromatic region near black, so that only black may substantially be printed. Thereby, no color blur occurs even if there is a color registration error or a print position error among YMCK colors, and a sharp black character can be reproduced.

An example of the relationship between the discrimination signal 153 and LUTs (tables 201 and 202) is shown below. Whether the table 201 or table 202 is used is determined in accordance with the discrimination signal 153.

1. black character region . . . table for character region (LUT: table 202)
2. chromatic character region . . . table for character region (LUT: table 202)
3. halftone-screen tone image . . . table for tone region (LUT: table 201)
4. continuous tone image . . . table for tone region (LUT: table 201).

Next, the structure of the filter section 107 is described.

The filter section 107 selectively switches filters for respective components of the CMYK density signals 154 in accordance with the discrimination signal 153 output from the image region discrimination section 105.

In a character region, in order to sharply record a character, a sharpening process (edge emphasis) is performed on a chromatic component of the character.

In a halftone-dot tone region, in order to prevent occurrence of moiré or the like, a smoothing process is performed to remove a halftone-dot component.

In a continuous tone region, in order to enhance sharpness, a band emphasis filter is used.

Figure 3:
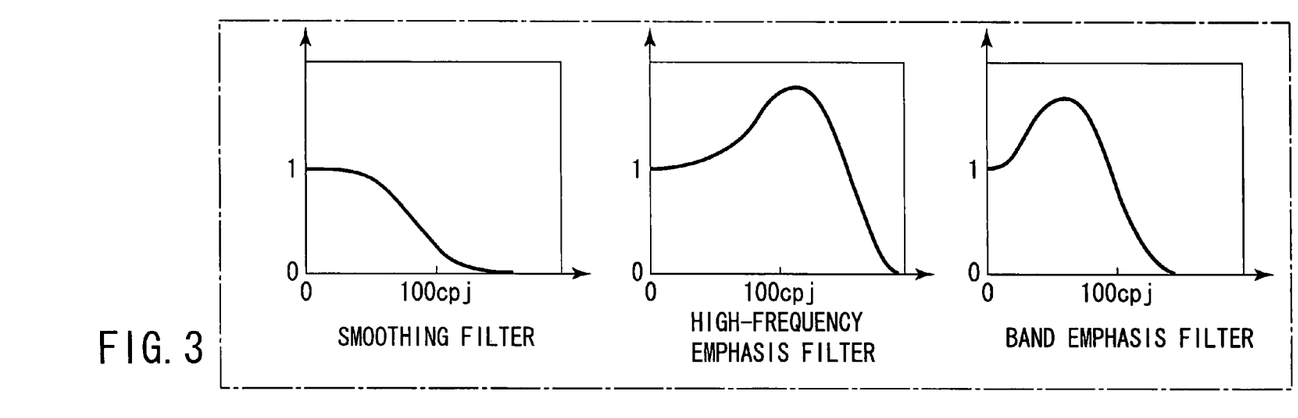
FIG. 3 shows frequency characteristics of filters in the first embodiment.

FIG. 3 shows the relationship between the discrimination signal 153 and filter characteristics, and indicates frequency characteristics of each filter. Specifically, in accordance with the discrimination signal, it is determined whether a smoothing filter, a high-frequency emphasis filter or a band emphasis filter is used.

1. Black character region . . . The high-frequency emphasis filter is used for a K signal, and the smoothing filters are used for CMY signals.
2. Chromatic character region . . . The high-region emphasis filter is used for CMY signals, and the smoothing filter is used for a K signal.
3. Halftone-screen tone image . . . The smoothing filter is used for CMYK signals.
4. Continuous tone image . . . The band emphasis filter is used for CMYK signals.

Next, the structure of the tone processing section 108 is described.

In an electrophotographic recording process, it is difficult to stably express multi-gray-level densities in units of a pixel. Normally, using an area modulation method, an intermediate density is expressed by a pattern of plural pixels (hereafter referred to as "screen pattern"). In this method, if the cycle of the screen pattern is increased, the number of gray levels and the tonal stability are enhanced, but the expressional resolution is degraded.

On the other hand, if the period of the screen pattern is decreased, the expressional resolution is enhanced but the number of gray levels and the tonal stability are degraded. Thus, a plurality of screen patterns are selectively used. For example, a screen pattern with a large cycle is used for an image such as a photo that requires a good tone curve or stability, and a screen pattern with a small cycle is used for an image such as a character or a line that requires a high resolution rather than a good tone curve.

In this embodiment, the tone processing section 108 performs the area modulation process and switches a plurality of modulation patterns in accordance with the discrimination signal 153. Thereby, as regards a tone region, an image with a smooth gradation and good tone curve can be reproduced. In addition, as regards a character region, a sharp image can be recorded.

Figure 4:
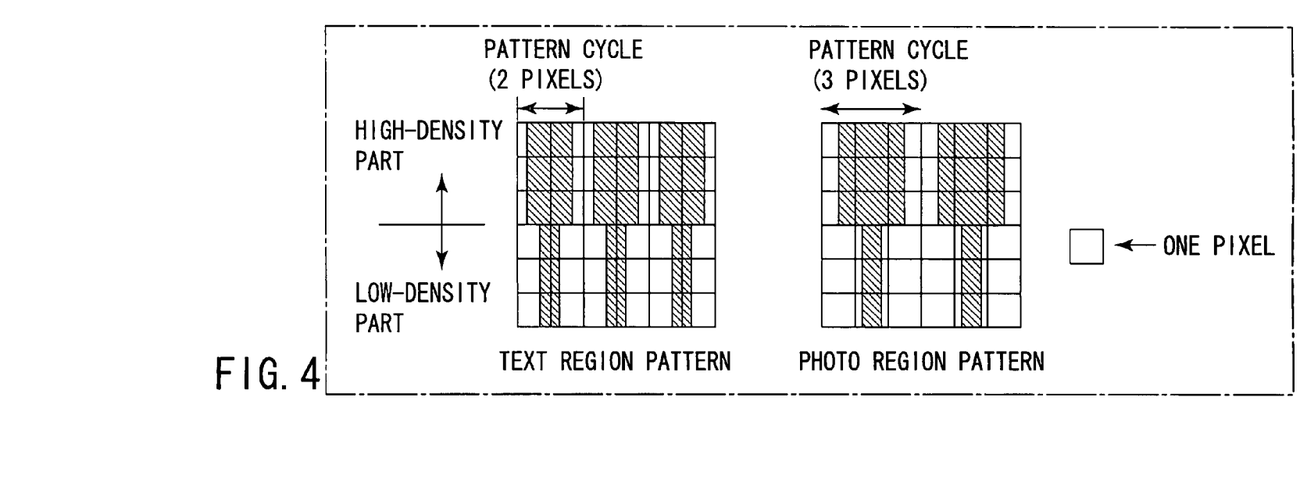
FIG. 4 shows screen patterns of a tone processing section in the first embodiment.

FIG. 4 shows examples of screen patterns for a text and a photo. That is, FIG. 4 shows a text region pattern and a photo region pattern.

The relationship between the discrimination signal 153 and screen patterns is shown below. One of the photo region pattern and tone region pattern is used in accordance with the discrimination signal 153.

1. Black character region . . . CMY signals: tone region pattern, K signal: character region pattern,
2. Chromatic character region . . . CMY signals: character region pattern, K signal: character region pattern,
3. Halftone-screen tone image . . . CMYK signals: tone region pattern,
4. Continuous tone image . . . CMYK signals: tone region pattern.

The structure of the image recording section 109 will now be described.

In this embodiment, electrophotography is used in the image recording section 109.

The principle of electrophotography is described in brief. A laser beam is intensity-modulated according to an image density signal. The modulated beam is applied to a photosensitive drum. A charge corresponding to the amount of the radiated beam occurs on the photosensitive surface of the photosensitive drum. Thus, a two-dimensional charge distribution corresponding to the image signal is formed on the photosensitive drum by causing the laser beam to scan the photosensitive drum in the axial direction of the photosensitive drum in accordance with the scan position of the image signal and by rotating the photosensitive drum in accordance with the scanning. Subsequently, a developing device applies a charged toner to the photosensitive drum. At this time, the toner, whose amount corresponds to potential, is attached to the photosensitive drum and an image is formed on the photosensitive drum. Then, the toner image on the photosensitive drum is transferred to recording paper via a transfer belt. Finally, the transferred toner image is fused and fixed on the recording paper by a fixing device. This operation is successively performed for four color toners of YMCK. Thus, a full-color image is recorded on the paper.

With the above-described structures, a proper process can be executed according to regions of an image, and it becomes possible to record a high-quality document image including a photo region and a text region, or a chromatic character and a black character.

However, in order to perform this process, it is necessary that the image region discrimination section 105 execute a correct discrimination process and produce the discrimination signal 153.

Next, the image region discrimination section 105 is described in detail.

The image region discrimination section 105 discriminates the kind of an image.

Figure 5:
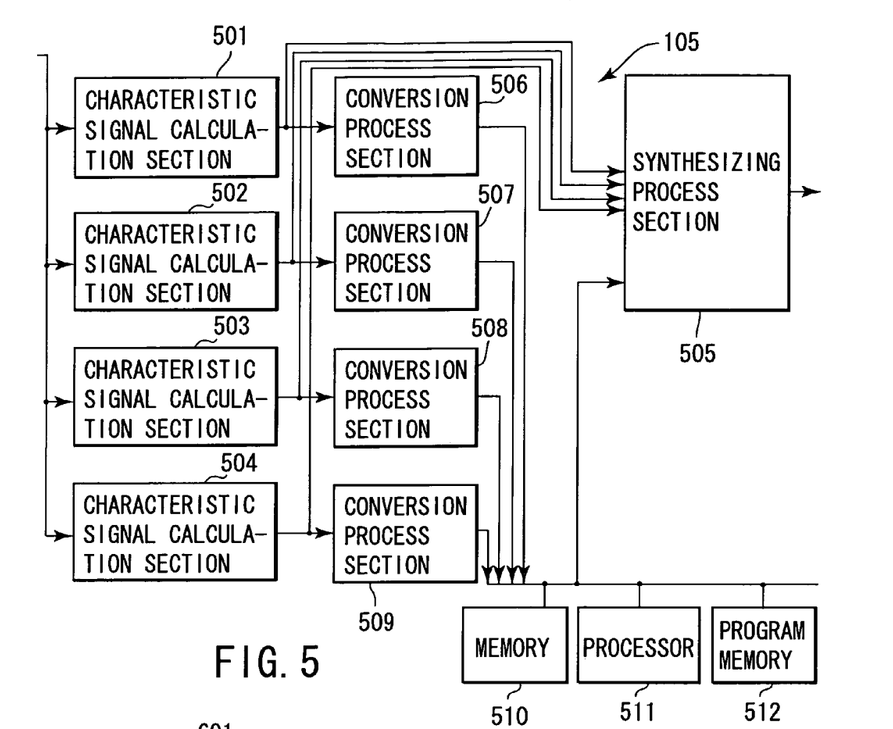
FIG. 5 shows the structure of an image region discrimination section in the first embodiment.

FIG. 5 shows the structure of the image region discrimination section 105. The image region discrimination section 105 comprises characteristic signal calculation sections 501 to 504, a synthetic processing section 505, conversion processing sections 506 to 509, a memory 510, a processor 511 and a program memory 512.

The characteristic signal calculation sections 501 to 504 receive RGB color image signals 152 and calculate and produce binary or multi-value characteristic signals corresponding to local densities, density variations and variation patterns of the received RGB color image signals 152.

The characteristic signal calculation section 501 calculates the degree of a linear edge in units of a pixel and outputs an edge characteristic signal corresponding to the degree of linear-edge-like quality. A pixel on an edge part has a large edge characteristic signal value, and a part other than the edge has a smaller edge characteristic signal. Specifically, based on the RGB color image signals 152, a luminance signal Y is calculated according to the following linear addition arithmetic operation:

$$Y = Ar \times R + Ag \times G + Ab \times B (Ar = \frac{1}{3}, Ag = \frac{1}{3}, Ab = \frac{1}{3}).$$

The luminance signal Y is subjected to, e.g. 8-directional edge detection filters. Referring to the filtered output values, it is determined whether an edge amount in a specified direction is large, and the determination result is output.

Alternatively, without using the luminance signal, the same calculations may be performed on the RGB signals, and maximum values of calculation results of the RGB components may be output.

The characteristic signal calculation section 502 produces a halftone-dot characteristic signals representing whether a region under consideration is a halftone-screen region or not. A large value is output for a region which is possibly a halftone-screen region, and a small value is output for other regions. This signal, like the edge characteristic signal, is determined by computing a luminance signal from the RGB color image signals 152, subjecting the luminance signal to an 8-directional edge detection filtering process, and determining whether the directions of edges are various or not.

The characteristic signal calculation section 503 calculates an achromatic characteristic amount S on the basis of the balance among RGB values of color image signals 152. If a pixel has an achromatic color such as white, black or gray, the achromatic characteristic signal S takes a value "0" or a small value. If a pixel has a color with a high chroma saturation, such as red, yellow, green or blue, the achromatic characteristic signal S takes a large value.

The achromatic characteristic signal S is calculated, for example, by the following equation:

$$S = \max(R, G, B) - \min(R, G, B).$$

The characteristic signal calculation section 504 calculates a luminance signal Y from RGB color image signals 152, expresses the luminance signal Y by three values, and produces a halftone characteristic signal Sc and a white background characteristic signal Sw.

To be more specific, the luminance signal Y is compared with two thresholds, Thy1 and Thy2 and a luminance level signal ' is computed according to the following conditional expressions:

if(Y<Thy1), then Sc=0, Sw=0 if(Y≧Thy1)and(Y<Thy2)thenSc=1, Sw=0 if(Y≧Thy2)thenSc=0, Sw=1.

This signal represents a background region (Sw=1), which is a region with no print image, or a halftone region (Sc=1) such as a photo region, or a region (Sw=Sc=0) such as a black character region, which is neither the background region nor the halftone region.

Based on the above principle, the thresholds Thy1 and Thy2 are preset.

In this embodiment, the characteristic signal calculation sections 501 to 504 use a common signal such as the luminance signal Y. Thus, these calculation processes, for example, may be commonly performed. This can reduce the circuitry scale.

The respective characteristic signals s output from the characteristic signal calculation sections 501 to 504 are input to the synthetic processing section 505 and comprehensively determined by the synthesizing processing section 505.

Further, the characteristic signals s output from the characteristic signal calculation sections 501 to 504 are subjected to conversion to a resolution and conversion of a bit number and are divisionally stored in the memory 510 in association with the individual characteristic amounts.

The conversion processing sections 506 to 509 in this embodiment calculate mean values of pixel values within a region of 9 pixels (3 pixels (vertical)×3 pixels (horizontal)) with respect to multi-value signals of the edge characteristic signal, halftone-screen characteristic signal and saturation characteristic signal. Then, each of the conversion processing sections 506 to 509 digitizes and converts each characteristic signal into a signal with a value of "0" or "1". As regards the white background characteristic signal and halftone characteristic signal, a majority-decision process is performed in a region of (3 pixels (vertical)×3 pixels (horizontal)) and a result of the majority-decision process is output.

By the conversion process, the signal amount stored in the memory 510 can be decreased. In addition, the calculation amount for the macro-scoped correction process and macro-discrimination, as described below, can be decreased.

An example of computation of characteristic signals is described below.

A computation result of characteristic signals corresponding to an original image is exemplified.

Figure 6:
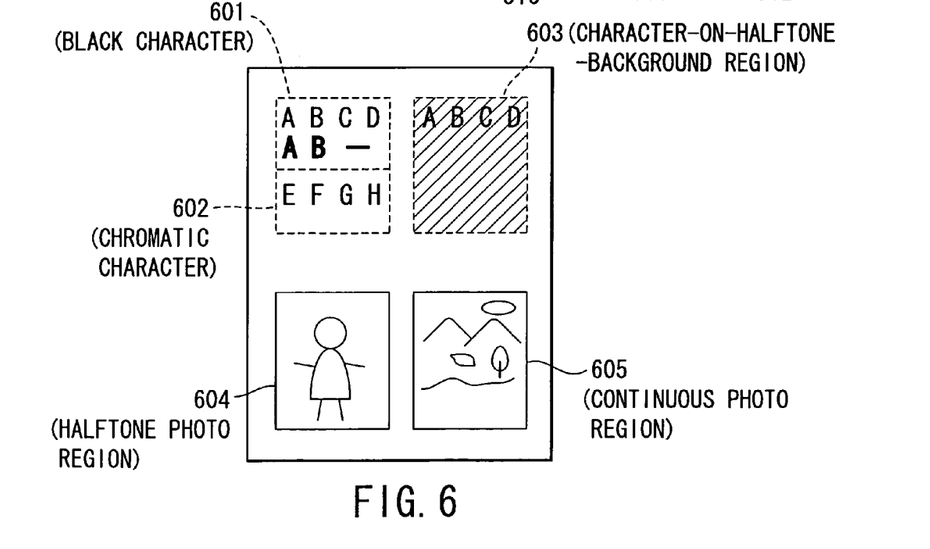
FIG. 6 shows an example of an original image.

FIG. 6 shows an example of an original image. For the purpose of simple description of discrimination processing, the original image has a schematic structure comprising a black character region 601, a chromatic character region 602, a character-on-halftone-background region 603, a halftone photo region 604 and a continuous photo region 605. The character-on-halftone-background region is a region where a black character is printed on a uniform halftone-dot hatching background.

Figure 7:
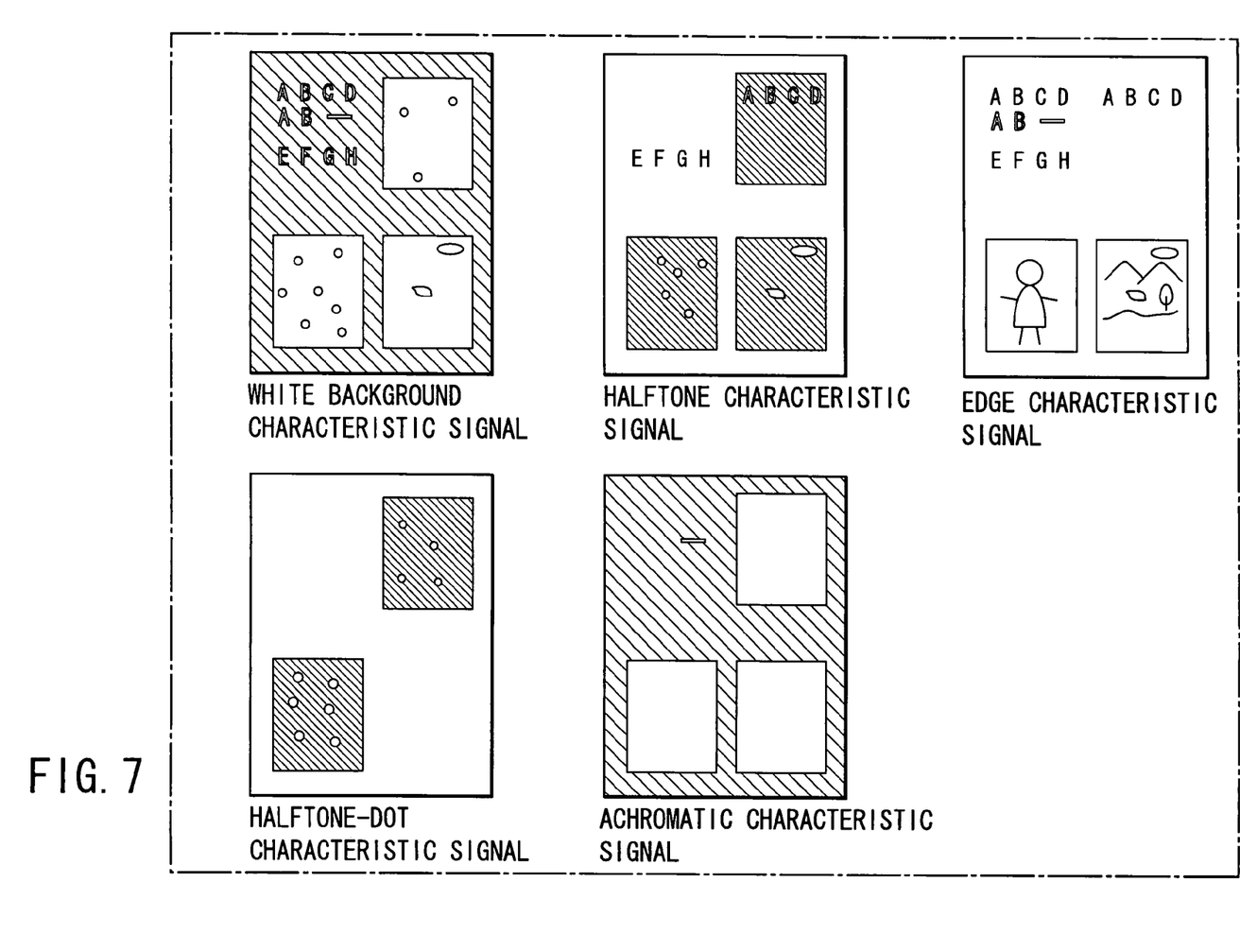
FIG. 7 shows examples of characteristic signal calculation results for an original image.

Portions (a) to (e) in FIG. 7 show calculation results of the five kinds of characteristic signals of the original image. Portion (a) shows a white background characteristic signal, portion (b) shows a halftone characteristic signal, portion (c) shows an edge characteristic signal, portion (d) shows a halftone-dot characteristic signal, and portion (e) shows an achromatic characteristic signal.

Next, the process executed by the processor 511 is described.

The processor 511 performs a macro-scoped correction process and a macro-discrimination process for the characteristic signals s stored in the memory 510. This process is executed according to a program stored in the program memory 512.

In this embodiment, a SIMD (Single Instruction Multiple Data)-type processor and a sequential-type processor are both used. The SIMD-type processor is capable of simultaneous parallel execution of the same process. In steps 1 to 4 in FIG. 8, the same process is executed for each pixel, and so the use of this processor realizes high-speed computation.

Alternatively, a CISC (Complex Instruction Set Computing) CPU or a RISC (Reduced Instruction Set Computing) CPU may be used.

Figure 8:
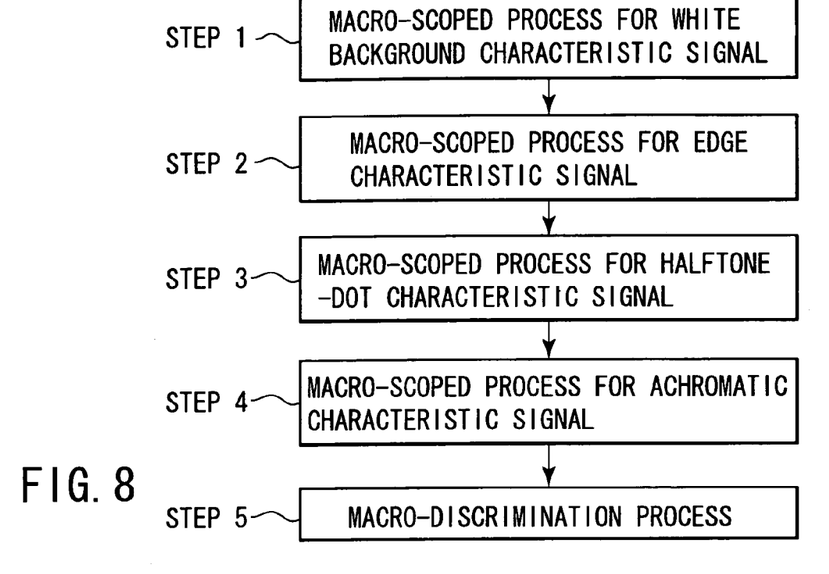
FIG. 8 is a flow chart of a processor process in the image region discrimination section according to the first embodiment.

The specific procedure of the process executed by the processor 511 will be described in detail with reference to FIG. 8.

In step 1, the white background characteristic signal is subjected to a smearing process, and a white background region is determined. In the smearing process, the pixel values of pixels interposed between two pixels, which meet the condition that both pixels have a value "1" and have an inter-pixel distance of a predetermined value ThSm or less, are corrected to "1".

Figure 9:
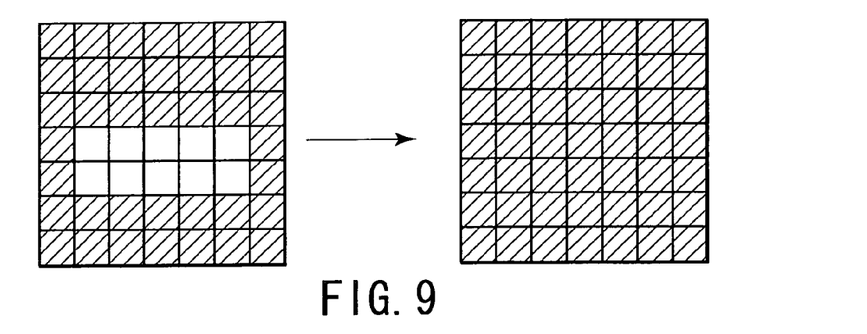
FIG. 9 is a view for explaining a smearing process.

FIG. 9 shows an example of this process.

In this step 1, a white background region on the original image is detected. The white background region includes a white part of the original paper and a character/figure area on the white part. That is, the white background region is a region other than a photo region and a graph/table area on a chromatic background. However, in the original characteristic signals, a character/line part on a white background is not determined to be a white background region. Thus, the smearing process is performed, and the pixel values corresponding to a fine character/line part on a white background are corrected to "1". Therefore, the precision in determining the white background region is enhanced.

In subsequent step 2, the edge characteristic signal is subjected to a smearing process, and the result of the process is produced as a character region signal. In principle, only an edge part has a value "1" as an edge characteristic amount, and an inside part of a thick character is not regarded as an edge part. The result of the smearing process is determined to be a text region, and so an inside part of a thick character is determined to be a text region. In addition, a predetermined value of a distance is set at a value approximately equal to an inter-character distance, whereby character strings arranged in rows can be connected and extraction of character strings in macro-discrimination (to be described later) can be facilitated.

Figure 10:
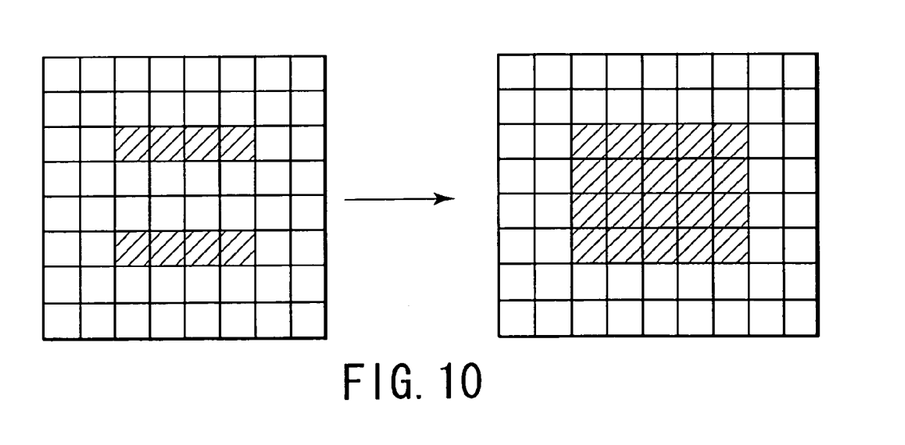
FIG. 10 is a view for explaining the smearing process.

FIG. 10 shows an example of this process.

In this embodiment, the smearing process is performed only with respect to pixels, which have equal coordinates in the main scan direction or sub-scan direction, in consideration of easier design of software and a computation speed of software. However, if discrimination with higher precision is required, smearing may be performed in an oblique direction of 45 or a given angle.

In step 3, the halftone-screen characteristic signal is subjected to a majority-decision process. In the majority-decision process, the number of pixels with pixel value "1", which are included in pixels adjacent to a pixel of interest, is counted. If the count value is greater than a predetermined value, an output value "1" is produced. If it is less than the predetermined value, an output value "0" is produced.

In general, a halftone-screen characteristic signal is often discriminated erroneously, and cyclically varying signals are obtained on half-dot regions. In a non-halftone region, too, end portions of lines, for instance, are erroneously discriminated sporadically. By executing the majority-decision process, such erroneous discrimination can be prevented and a high-precision halftone-screen region signal can be obtained.

In step 4, the achromatic characteristic signals is subjected to a smearing process.

In the present embodiment, a smearing process is performed only in the sub-scan direction. The purpose of this process is to correct color-difference noise due to color misregistration caused by, e.g. vibration at the time of image reading. In a color scanner having a 3-line sensor that is widely used for color image input, vibration of the carriage causes a relative displacement of read positions of RGB signals. This may result in color-difference noise. This phenomenon is conspicuous on a black character or an edge portion of a black line. An edge part of a black character, which should normally be achromatic, is determined to be chromatic due to imbalance of RGB signals. This problem occurs only at edge parts in the sub-scan direction. Thus, the problem can be solved by performing the smearing process in the sub-scan direction, as in this embodiment.

Figure 11:
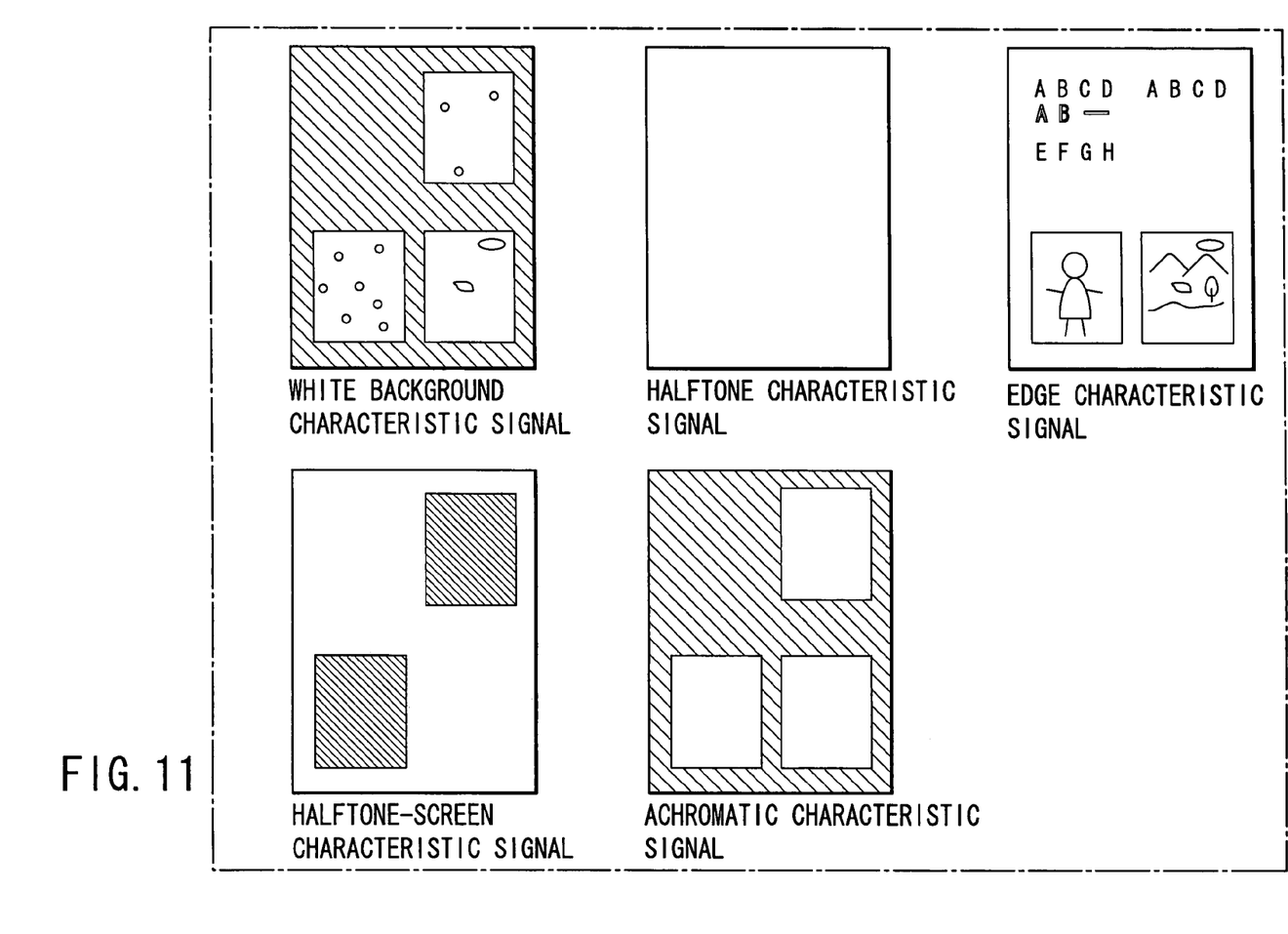
FIG. 11 shows an example of the result of a macro-scoped correction process.

Portions (a) to (e) of FIG. 11 show examples of results of macro-scoped correction processes in steps 1 to 4, which are executed for the characteristic signals s in FIG. 7. In FIG. 11, portion (a) shows a white background characteristic signal, portion (b) shows a halftone characteristic signal, portion (c) shows an edge characteristic signal, portion (d) shows a halftone-screen characteristic signal, and portion (e) shows an achromatic characteristic signal.

The macro-scoped correction process can correct the omission of a halftone-screen characteristic signals in a halftone-screen region, the determination of an inside part of a character edge, and the color misregistration of a black character due to scanner jitter.

In step 5, macro-scale discrimination is performed on the basis of output signals in steps 1 to 4. In steps 1 to 4, high-connectivity region signals are obtained since the occurrence of erroneous discrimination is reduced by the smearing process and majority-decision process. In step 5, connectivity is determined with respect to the white background region, halftone region, character region and halftone-screen region, and a connected rectangular region is extracted. Then, the attribute, size, positional relationship and inclusive relationship of the extracted connected region are examined to determine the kind of the region.

Finally, the region under consideration is discriminated as one of the following four kinds:
1. background graphic
2. halftone-dot background graphic
3. halftone-dot photo
4. continuous photo.

For example, if a plurality of character regions lie on a halftone-screen region, the region under consideration is determined to be a halftone-screen background graphic. A region, which is a halftone region of a predetermined size or more and does not overlap a halftone-dot region, is determined to be a continuous photo region.

Detailed algorithms for macro-discrimination are disclosed in Jpn. Pat. Appln. KOKAI Publication No. 11-69150. The discrimination result is stored in the memory 510 as macro-discrimination information of 2 bits per pixel. The macro-discrimination information is stored as a position information table, but it may be stored as bitmap information. When the macro-discrimination process is completed, the macro-discrimination information stored in the memory 510 is converted to a time-series bitmap image signal in sync with a predetermined signal, and the time-series bitmap image signal is delivered to the synthesizing processing section 505.

The timing and sequence of the signal process at this time will be described later.

Finally, the synthetic processing section 505 executes a comprehensive discrimination process using the characteristic signal signals output from the characteristic signal calculation sections 501 to 504 and the macro-discrimination information output from the memory 510.

Next, the process sequence is described.

The sequence of the signal processing in an ordinary copying operation is described in detail.

Figure 12:
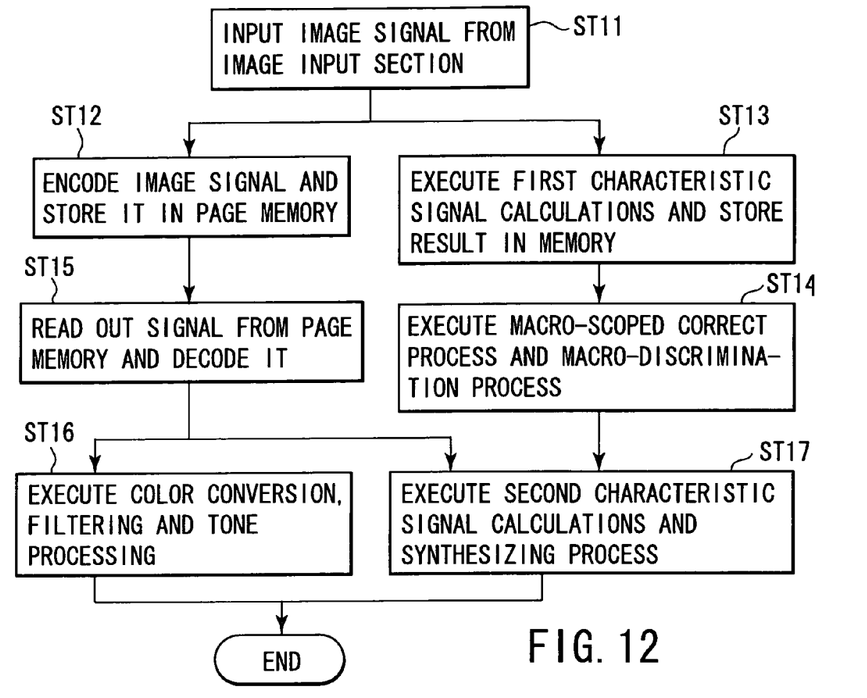
FIG. 12 illustrates an operational sequence in the first embodiment.

FIG. 12 illustrates the process sequence.

A color image signal 151 read by the image input section 101 (ST11) is encoded by the encoding section 102 and stored in the page memory 103 (ST12). At the same time, the color image signal 151 is delivered to the image region discrimination section 105.

In the image region discrimination section 105, the characteristic signal calculation sections 501 to 504 perform first characteristic signal calculations, and the conversion processing sections 506 to 509 execute conversion of a resolution and a bit number. Then, the characteristic signal calculation results are stored in the memory 510 (ST13).

As described above, the first characteristic signal calculations and encoding are executed at the same time.

Subsequently, the processor 511 reads out the characteristic signal calculation results from the memory 510 and executes the macro-scoped correction process and macro-discrimination process. The processor 511 stores the processed results in the memory 510 as macro-discrimination information (ST14).

After the image region discrimination section 105 completes the macro-scoped correction process and macro-discrimination process, the encoded color image signals are read out of the page memory 103 and are decoded into RGB color image signals 152 by the decoding section 104 (ST15). The decoded color image signals 152 are input to the image region discrimination section 105 and color conversion section 106.

At the same time, in the image region discrimination section 105, the macro-discrimination information is read out of the memory 510 and delivered to the synthetic processing section 505.

In the image region discrimination section 105, the input color image signals 152 are subjected to second characteristic signal calculations, and the results of the second characteristic signal calculations are output to the synthetic processing section 505.

Thereby, in the image region discrimination section 105, the results of the second characteristic signal calculations and the macro-discrimination information are input to the synthesizing processing section 505 at the same time, and the synthetic process is carried out (ST16). The synthesizing processing section 505 outputs a discrimination signal 153 as the result of the synthesizing process to the color conversion section 106, filter section 107 and tone processing section 108.

The color conversion section 106 executes, based on the input discrimination signal 153, a color conversion process for converting the RGB color image signals 152 to CMYK density signals 154. The color conversion section 106 outputs the CMYK density signals 154 to the filter section 107.

The filter section 107 executes, based on the input discrimination signal 153, a filtering process for the density signals 154, and delivers the filtered result to the tone processing section 108.

The tone processing section 108, based on the input discrimination signal 153, subjects the filtered density signals 154 to tone processing (ST17).

As described above, the decoded color image signals 152 are subjected to the color conversion process, filtering process and tone process. At the same, these signals are subjected to the processes corresponding to the respective regions of the image in accordance with the discrimination signal 153 output from the synthesizing processing section 505 of image region discrimination section 105.

The points of the present invention according to the first embodiment are:

1. The characteristic signal calculation results obtained by hardware are subjected to the macro-scoped correction and macro-discrimination by the processor.

2. The resolutions and signal bit amounts of the characteristic signals are decreased, and the resultant signals are stored in the memory.

3. Both the macro-discrimination information and characteristic signals are synthesized to produce a final discrimination signal.

As has been described above, according to the first embodiment, the macro-scoped correction process and macro-discrimination process are executed by the processor, whereby the circuitry scale for the macro-scoped correction process with a large reference region can be reduced.

Moreover, after the resolution and bit amount of the signals are decreased, the macro-scoped correction process and macro-discrimination process are executed. Thereby, the hardware scale and computation time can be reduced.

Furthermore, both the macro-discrimination and the discrimination using characteristic signals are employed, whereby the high-precision, high-resolution discrimination signal (discrimination result) can be obtained.

A second embodiment of the invention will be described.

In the first embodiment, much computation time is needed in the macro-discrimination process. Thus, there is the problem that the copying speed decreases. In the second embodiment, the processor does not perform macro-discrimination, and it performs only the macro-scoped correction process, thereby decreasing the processing time.

Figure 13:
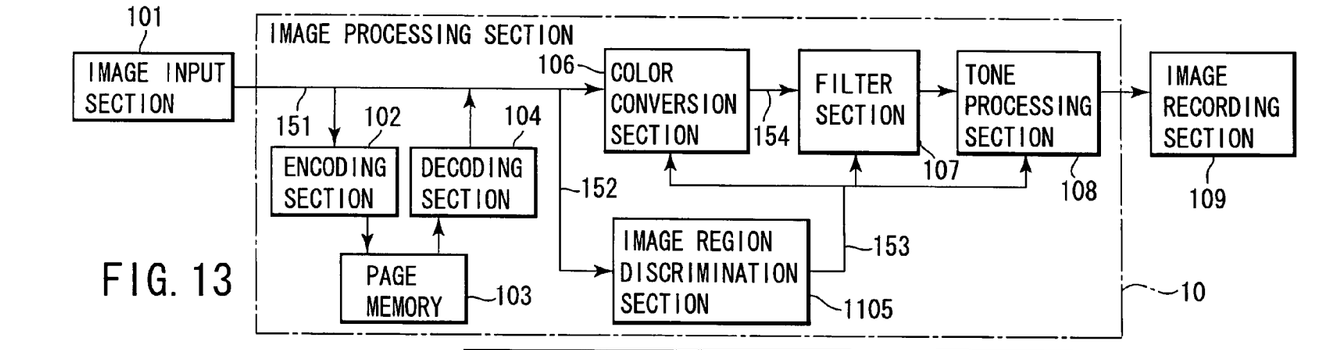
FIG. 13 shows the structure of an image processing section according to a second embodiment of the invention.

FIG. 13 shows the structure of an image processing section 10 according to the second embodiment. The structure of the second embodiment is substantially the same as that of the first embodiment. The difference is that a signal delay section is provided in an image region discrimination section 1105. An encoding section 102, a page memory 103, a decoding section 104, a color conversion section 106, a filter section 107 and a tone processing section 108 are the same as those in the first embodiment. Thus, these components are denoted by like reference numerals and a description thereof is omitted.

The content of the process in the second embodiment is described.

Figure 14:
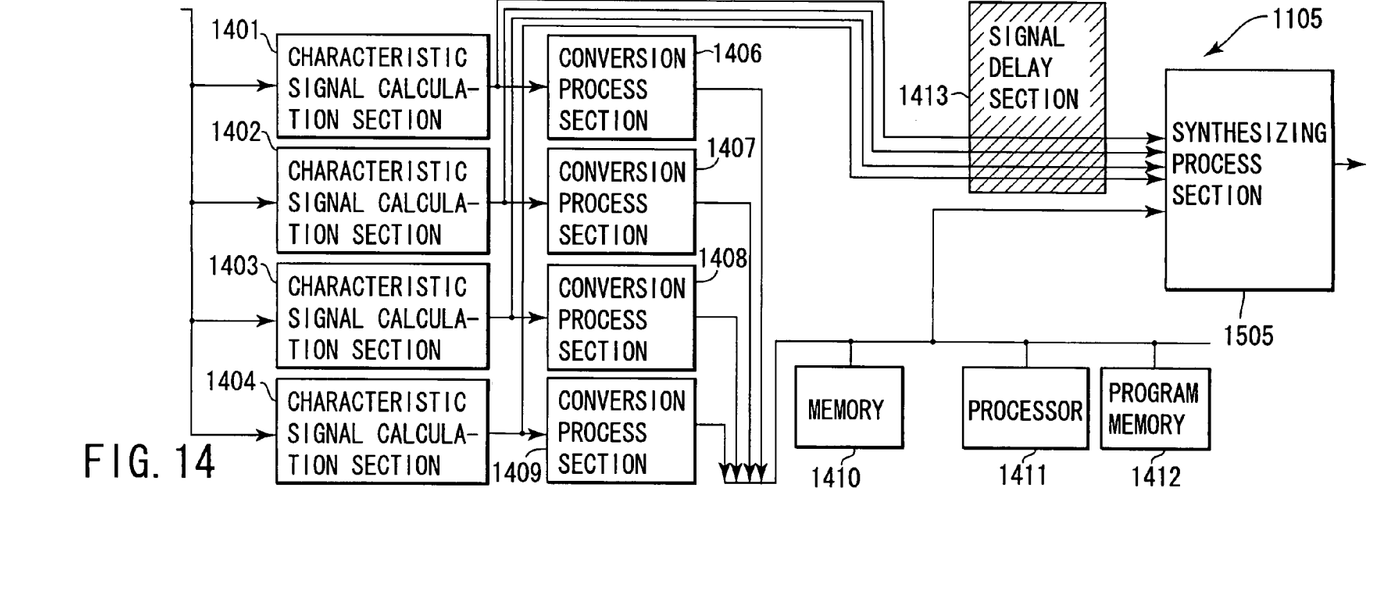
FIG. 14 shows the structure of an image region discrimination section in the second embodiment.

FIG. 14 shows the structure of the image region discrimination section 1105 in the second embodiment. The image region discrimination section 1105 comprises characteristic signal calculation sections 1401 to 1404, conversion processing sections 1406 to 1409, a memory 1410, a processor 1411, a program memory 1412, a signal delay section 1413 and a synthesizing process section 1505.

The sole differences are the addition of the signal delay section 1413, the operation of the image region discrimination section 1105 and the process sequence of the synthesizing process section 1505.

Figure 15:
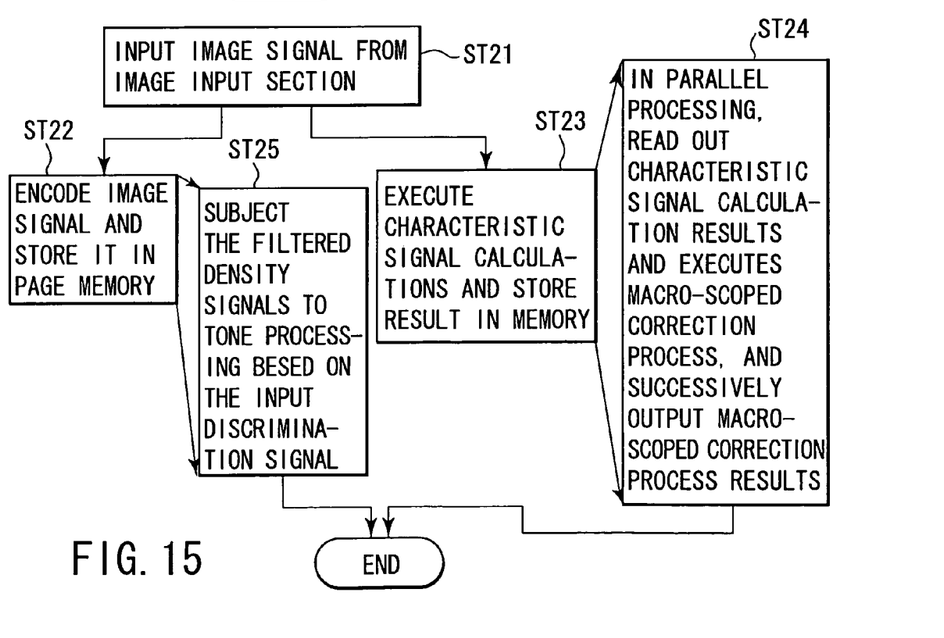
FIG. 15 illustrates an operational sequence in the second embodiment.

FIG. 15 illustrates the process flow.

A color image signal 151 read by the image input section 101 (ST21) is encoded by the encoding section 102 and stored in the page memory 103 (ST22). At the same time, the color image signal 151 is delivered to the image region discrimination section 1105.

In the image region discrimination section 1105, the characteristic signal calculation sections 1401 to 1404 perform characteristic signal calculations, and the conversion processing sections 1406 to 1409 execute conversion of a resolution and a bit number. Then, the characteristic signal calculation results are stored in the memory 1410 (ST23). The computation in the characteristic signal calculation sections 1401 to 1404 is the same as that in the characteristic signal calculation sections 501 to 504 of the first embodiment, so a description thereof is omitted.

In the parallel processing, the processor 1411 reads out the characteristic signal calculation results from the memory 1410 and executes the macro-scoped correction process, and successively outputs the macro-scoped correction process results to the synthesizing processing section 1505 (ST24).

In the second embodiment, the macro-discrimination process is not performed, and only the macro-scoped correction process is performed. In the first embodiment, the discrimination results are output after completion of the processing for the entire image. By contrast, in the second embodiment, each time a calculation result of the macro-scoped correction process is locally produced, the calculation result is successively input to the synthesizing processing section 1505.

On the other hand, the characteristic signals output from the characteristic signal calculation sections 1401 to 1404 are delayed by the signal delay section 1413 and then input to the synthetic processing section 1505. In the conversion processing sections 1406 to 1409, the processing is performed by referring to information of adjacent regions of a pixel of interest. As a result, a delay corresponding to the area of the reference region of the macro-scoped correction process occurs from the output of the characteristic signals of the pixel of interest to the completion of the macro-scoped correction process. To cope with this, the signal delay section 1413 delays the characteristic signals s from the characteristic signal calculation sections 1401 to 1404, whereby synchronism is established between the characteristic signals output from the characteristic signal calculation sections 1401 to 1404 to the synthetic processing section 1505 and the calculation result after the macro-scoped correction process (macro-scoped correction process result).

The synthetic processing section 1505 outputs a discrimination signal 153 as the result of the synthetic process to the color conversion section 106, filter section 107 and tone processing section 108.

With a slight delay from the write in the page memory 103 in step ST22, the encoded color image signals are read out of the page memory 103 and decoded into the RGB color image signals 152 by the decoding section 104. The decoded color image signals 152 are input to the image region discrimination section 1105 and color conversion section 106.

The discrimination signal 153 as the result of the synthetic process is output to the color conversion section 106, filter section 107 and tone processing section 108.

The color conversion section 106 executes, based on the input discrimination signal 153, a color conversion process for converting the RGB color image signals 152 to CMYK density signals 154. The color conversion section 106 outputs the CMYK density signals 154 to the filter section 107.

The filter section 107 executes, based on the input discrimination signal 153, a filtering process for the density signals 154, and delivers the filtered result to the tone processing section 108.

The tone processing section 108, based on the input discrimination signal 153, subjects the filtered density signals 154 to tone processing (ST25).

The points of the present invention according to the second embodiment are:

1. The characteristic signal calculation results obtained by hardware are subjected to the macro-scoped correction by the processor.

2. The resolutions and signal bit amount of the characteristic signals s are decreased, and the resultant signals are stored in the memory.

3. Both the macro-scoped correction calculation result and characteristic signals are synthesized to produce a final discrimination signal.

As has been described above, according to the second embodiment, the macro-scoped correction process is executed by the processor, whereby the circuitry scale for the macro-scoped correction process with a large reference region can be reduced.

Moreover, after the resolution and bit number of the signals are decreased, the macro-scoped correction process is executed. Thereby, the hardware scale and computation time can be reduced.

By using only the signals after the macro-scoped correction, a discrimination result with a relatively high precision and resolution is obtained, and the discrimination process can be executed almost in real time.

A third embodiment of the invention will now be described.

The structure of the image processing section of the third embodiment is the same as that shown in FIG. 1 in connection with the first embodiment. In the third embodiment, a plurality of process modes can be switched. In a first process mode, like the first embodiment, the macro-scoped correction process and macro-discrimination process are executed by the image region discrimination section. In a second process mode, like the second embodiment, only the macro-scoped correction process is performed. The contents of the respective processes are the same as those in the first and second embodiments, so a detailed description thereof is omitted.

As has been described above, according to the third embodiment, high-precision discrimination can be performed in the first process mode, although a processing time is relatively long. In the second process mode, a processing time is shortened, although discrimination precision lowers.

The externally designated mode may be set as a mode with a stress on image quality, or as another mode.

As regards the externally designated mode, there are at least two modes. In at least one mode, the calculation processing speed for one pixel in the processor is equal to or higher than the input speed of the image signals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

a characteristic signal calculation section that calculates at least one characteristic amount of an input image signal to produce a first characteristic signal;

a conversion process section that executes a conversion process for decreasing a resolution and the number of bits of the first characteristic signal produced by the characteristic signal calculation section to convert the first characteristic signal into a second characteristic signal having a characteristic amount smaller than that of the first characteristic signal;

a storing section that stores the second characteristic signal that is obtained by conversion by the conversion process section;

a processor that reads out the second characteristic signal stored in the storing section, and executes an arithmetic operation for only a macro-scoped correction process with software or an arithmetic operation for both the macro-scoped correction process and a macro-discrimination process with the software;

a synthesizing process section that outputs a discrimination signal obtained by synthesizing an arithmetic result of the processor and the first characteristic signal produced by the characteristic signal calculation section; and an image processing section that executes a color conversion process, a frequency filtering process and a tone process for the image signal in accordance with the discrimination signal output from the synthesizing process section, wherein in the macro-scoped process, a pixel value is corrected by one of a smearing process in which pixel values of pixels interposed between two pixels which both have a value "1", and which are separated from each other by a distance of a predetermined value or less are changed to "1", and a majority process in which the number of pixels having pixel value "1", which are included in pixels close to a pixel of interest, is counted, and when the counted number is greater than a predetermined value, an output value is determined as "1", and when the counted number is smaller than the predetermined value, the output value is determined as "0", and wherein in the macro-discrimination process, a connected region is extracted with respect to a white background region, a halftone region, a character region and a halftone-dot region, and the extracted connected region is determined as one of a background graphic, a halftone-dot background graphic, a halftone-dot photo and a continuous photo region.

2. The image processing apparatus according to claim 1, wherein the characteristic signal calculation section includes an edge characteristic calculation section that calculates a degree of a linear edge for each pixel of the input image signal, and outputs an edge characteristic signal corresponding to the calculated degree of the linear edge.

3. The image processing apparatus according to claim 1, wherein the characteristic signal calculation section includes a halftone-dot characteristic section that outputs a halftone-screen characteristic signal indicative of presence/absence of the halftone-screen region with respect to the input image signal.

4. The image processing apparatus according to claim 1, wherein the characteristic signal calculation section includes an achromatic characteristic calculation section that outputs an achromatic characteristic signal indicative of a characteristic signal of a chroma saturation of a pixel with respect to the input image signal.

5. The image processing apparatus according to claim 1, wherein the characteristic signal calculation section includes a brightness characteristic calculation section that calculates a brightness from the input image signal, and produces a halftone characteristic signal and a white background characteristic signal in accordance with a relationship between the brightness and two predetermined threshold values, which is obtained by comparing the brightness with the two predetermined threshold values.

6. The image processing apparatus according to claim 1, wherein the image processing section includes a color conversion section that executes a color conversion of the image signal in accordance with the discrimination signal, a filter section that executes a filtering process in accordance with the discrimination signal, and a tone processing section that executes a tone processing in accordance with the discrimination signal.

7. The image processing apparatus according to claim 6, wherein the color conversion section converts RGB image signals to YMCK density signals, using a text region conversion table or a photo region conversion table in accordance with the discrimination signal.

8. The image processing apparatus according to claim 6, wherein the filter section executes the filtering process using a high-frequency emphasis filter and a smoothing filter in accordance with the discrimination signal.

9. The image processing apparatus according to claim 6, wherein the tone process section executes the tone process using a text region pattern and a photo region pattern in accordance with the discrimination signal.

10. The image processing apparatus according to claim 1, wherein the processor reads out the second characteristic signal stored in the storing section and performs, in accordance with a preset process mode, the arithmetic operation for the macro-scoped correction process and the macro-discrimination process, or the arithmetic operation for only the macro-scoped correction process.

11. An image processing method for an image processing apparatus, comprising:

calculating at least one characteristic amount of an input image signal to produce a first characteristic signal;

executing a conversion process for decreasing a resolution and the number of bits of the produced first characteristic signal to convert the first characteristic signal into a second characteristic signal having a characteristic amount smaller than that of the first characteristic signal;

storing the second characteristic signal obtained by the conversion process;

reading out the stored second characteristic signal, and executing an arithmetic operation for only a macro-scoped correction process with software or an arithmetic operation for both the macro-scoped correction process and a macro-discrimination process with the software;

outputting a discrimination signal obtained by synthesizing an arithmetic result of the arithmetic operation and the produced first characteristic signal; and executing a color conversion process, a frequency filtering process and a tone process for the image signal in accordance with the output discrimination signal, wherein in the macro-scoped process, a pixel value is corrected by one of a smearing process in which pixel values of pixels interposed between two pixels which both have a value "1", and which are separated from each other by a distance of a predetermined value or less are changed to "1", and a majority process in which the number of pixels having pixel value "1", which are included in pixels close to a pixel of interest, is counted, and when the counted number is greater than a predetermined value, an output value is determined as "1", and when the counted number is smaller than the predetermined value, the output value is determined as "0", and wherein in the macro-discrimination process, a connected region is extracted with respect to a white background region, a halftone region, a character region and a halftone-dot region, and the extracted connected region is determined as one of a background graphic, a halftone-dot background graphic, a halftone-dot photo and a continuous photo region.

12. The image processing method according to claim 11, wherein the stored second characteristic signal is read out and the arithmetic operation performs, in accordance with a preset process mode, the arithmetic operation for the macro-scoped correction process and the macro-discrimination process or the arithmetic operation for only the macro-scoped correction process.

* * * * *